(12) United States Patent
Hettle

(10) Patent No.: US 9,714,707 B2
(45) Date of Patent: Jul. 25, 2017

(54) SEALING STRUCTURE FOR A DEVICE AND METHOD AGAINST FLUID ENTRY

(71) Applicant: Continental Automotive Systems, Inc., Auburn Hills, MI (US)

(72) Inventor: Michael Hettle, Onsted, MI (US)

(73) Assignee: Continental Automotive Systems, Inc., Auburn Hill, MI (US)

( * ) Notice: Subject to any disclaimer, the term of this patent is extended or adjusted under 35 U.S.C. 154(b) by 0 days.

(21) Appl. No.: 15/024,261

(22) PCT Filed: Sep. 11, 2014

(86) PCT No.: PCT/US2014/055154
§ 371 (c)(1),
(2) Date: Mar. 24, 2016

(87) PCT Pub. No.: WO2015/047738
PCT Pub. Date: Apr. 2, 2015

(65) Prior Publication Data
US 2016/0215884 A1   Jul. 28, 2016

Related U.S. Application Data

(60) Provisional application No. 61/883,986, filed on Sep. 27, 2013.

(51) Int. Cl.
*F16J 15/02* (2006.01)
*F16J 15/06* (2006.01)

(52) U.S. Cl.
CPC .......... *F16J 15/025* (2013.01); *F16J 15/022* (2013.01); *F16J 15/06* (2013.01); *F16J 15/062* (2013.01)

(58) Field of Classification Search
CPC   F16J 15/062; F16J 15/025; F16J 15/02; F16J 15/06
See application file for complete search history.

(56) References Cited

U.S. PATENT DOCUMENTS 2,828,789 A * 4/1958 Geisler .............. B65D 43/0206
220/783
3,428,209 A * 2/1969 Jenkins .................. B65D 53/02
220/378

(Continued)

FOREIGN PATENT DOCUMENTS

CN         1105430 A     7/1995
CN       101251188 A     8/2008
(Continued)

OTHER PUBLICATIONS

International Search Report and Written Opinion dated Feb. 5, 2015 from corresponding International Patent Application No. PCT/US2014/055154.

*Primary Examiner* — Kristina Fulton
*Assistant Examiner* — Eugene G Byrd

(57) ABSTRACT

A sealing structure seals first and second components of a device. The second component is removable from the first component so as to gain access to an interior of the device. The structure includes a body composed of compressible material. An axial seal portion of the body defines an axial seal between the first and second components. A radial seal portion of the body defines a radial seal between the first and second components. A lip seal portion of the body defines a lip seal between the first and second components. The first and second component can be a housing and a cover of a vehicle fob.

16 Claims, 1 Drawing Sheet

(56) References Cited

U.S. PATENT DOCUMENTS

| | | | |
|---|---|---|---|
| 3,696,962 A | | 10/1972 | Fehres et al. |
| 3,989,160 A | | 11/1976 | Manning et al. |
| 4,228,012 A | * | 10/1980 | Pall ................. B01D 29/15 210/238 |
| 4,946,064 A | * | 8/1990 | VanCucha .......... B65D 43/0212 220/795 |
| 5,246,065 A | * | 9/1993 | Huff .................. B29C 37/0082 165/173 |
| 6,629,619 B2 | * | 10/2003 | Sato ....................... H02G 3/088 220/3.8 |
| 2002/0160133 A1 | * | 10/2002 | Jeter ....................... A47J 47/02 428/35.7 |
| 2004/0041354 A1 | * | 3/2004 | Derr ....................... F16J 15/062 277/628 |
| 2004/0041355 A1 | * | 3/2004 | Suzuki .................. B65D 53/02 277/650 |
| 2004/0159236 A1 | * | 8/2004 | Otsuka .................. B65D 53/02 96/108 |
| 2013/0146323 A1 | * | 6/2013 | Yamaguchi ............ H05K 5/061 174/50 |
| 2013/0264225 A1 | * | 10/2013 | Miyagawa ............. F16J 15/024 206/37 |
| 2016/0273654 A1 | * | 9/2016 | Yu ......................... F16J 15/025 |

FOREIGN PATENT DOCUMENTS

| | | |
|---|---|---|
| CN | 101715525 A | 5/2010 |
| CN | 103174831 A | 6/2013 |
| CN | 203153405 U | 8/2013 |
| DE | 7503812 U | 7/1975 |

\* cited by examiner

SEALING STRUCTURE FOR A DEVICE AND METHOD AGAINST FLUID ENTRY

FIELD

The invention relates to devices requiring a serviceable battery cavity sealed against fluids and, in particular, to a battery-operated vehicle fob that seals against fluids yet allows the fob to be serviceable so as to opened and closed to change the battery.

BACKGROUND

Many conventional keyless entry fobs for vehicles (as well as most other electronic devices) feature or require a serviceable battery. Some fobs use an O-ring or another type of soft material compression member to provide a seal between the body and the cover of the fob. Other conventional fobs employ a tight fit between a soft plastic portion and a harder plastic portion the fob. These keyless entry fobs can be a Passive Entry Passive Start ("PEPS") key or a standard key fob.

Typical seals for fobs have a single bead of soft material or plastic stab ring pushing against a soft material. Some fobs have a lip seal, but the lip is compressed and acts as a compression seal. However, adequate sealing of these fobs may not be provided with these conventional seals, thereby permitting fluid to enter the fob and cause damage.

Thus, there is a need to provide a device, such as a fob, having sealing structure that provides a radial, axial and lip seal in a very compact space.

SUMMARY

An object of the invention is to fulfill the needs referred to above. In accordance with the principles of the present invention, this objective is obtained by providing a sealing structure for sealing first and second components of a device. The second component is removable from the first component to gain access so as to an interior of the device. The sealing structure includes a body composed of compressible material. An axial seal portion is integral with the body and is constructed and arranged to be compressed to define an axial seal between the first and second components. A radial seal portion is integral with the body and is constructed and arranged to be compressed to define a radial seal between the first and second components. A lip seal portion is integral with the body and is constructed and arranged to be compressed to define a lip seal between the first and second components.

In accordance with another aspect of a disclosed embodiment, a method is provided for sealing a device having a first component and second component. The second component is removable from the first component so as to gain access to an interior of the device. The method provides a single sealing structure having an axial seal portion, a radial seal portion, and a lip seal portion. The sealing structure is placed on a surface of the first component. The second component is secured to the first component so that 1) the axial seal portion is compressed axially to define an axial seal against a first surface, 2) the radial seal portion is compressed radially, defining a radial seal against a second surface, and 3) the lip seal portion is compressed to define a lip seal against the a first surface thereby sealing the interior.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
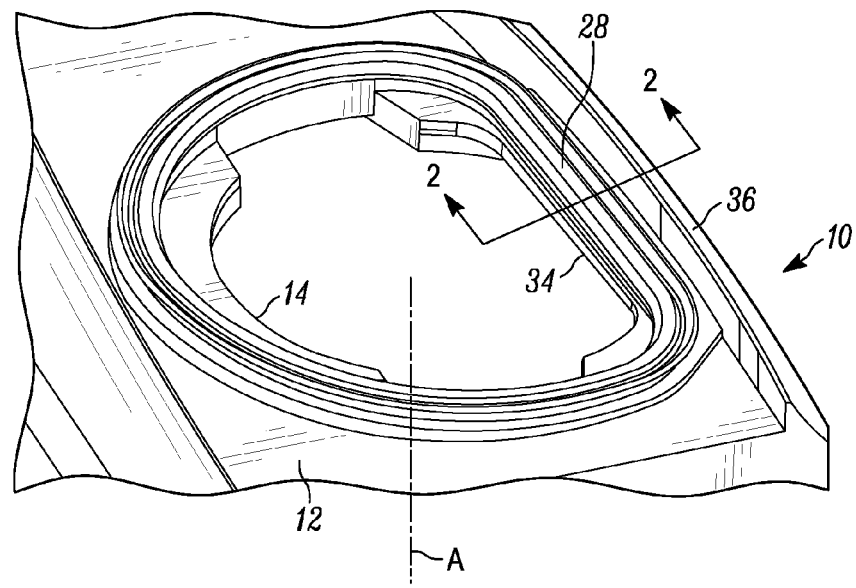
FIG. 1 is a view of sealing structure provided in accordance with an embodiment.

With reference to FIG. 1, a sealing structure is shown, generally indicated at 10, in accordance with an embodiment. The sealing structure 10 includes a body 12 having an opening 14 there-through, constructed and arranged to provide a seal between two components. The body 12 is constructed and arranged as a gasket to substantially surround an area to be sealed. The sealing structure 10 can fully surround the area to be sealed, but not necessarily surround the whole volume to be sealed.

Figure 2:
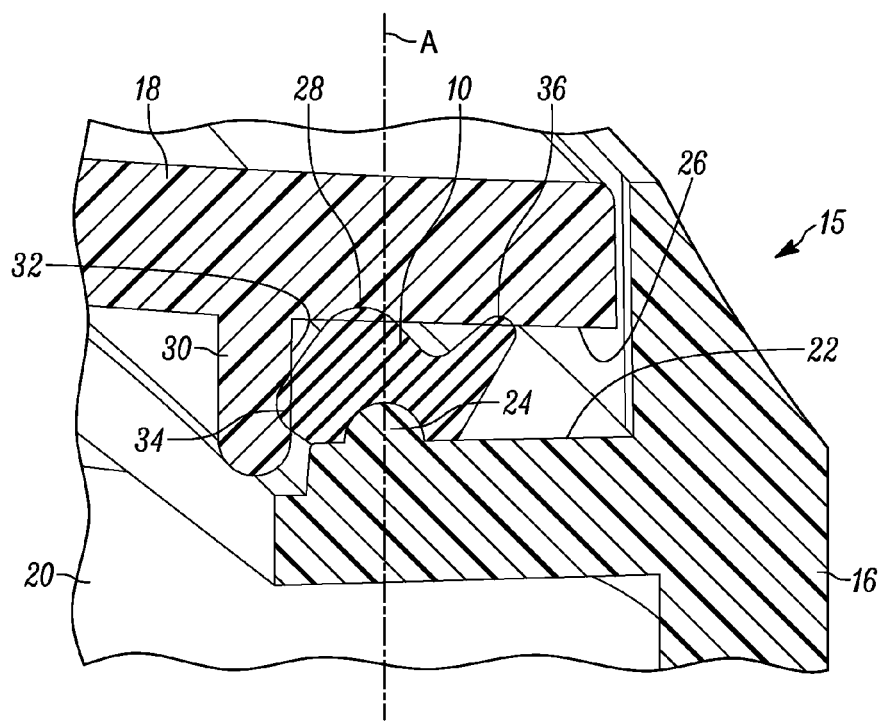
FIG. 2 is a cross-sectional view of a device having a cover and a housing, shown with a cross-section of the sealing structure taken along line 2-2 in FIG. 1 disposed therebetween so as to seal the cover with respect to the housing.

The sealing structure 10 preferably comprises a soft, compressible material such as an elastomer. FIG. 2 is shows a cross-section of the sealing structure 10 taken along the line 2-2 in FIG. 1 disposed in sealing relation in a device, generally indicated at 15. In particular, the sealing structure 10 is provided to seal a first component 16 and a second component 18. In the embodiment, the first component 16 is a housing and the second component 18 is a cover, preferably of a fob for a vehicle such as a key fob. The cover 18 is removable from the housing 16 so as to gain access to a volume or interior 20 of the device 15 so as to gain access to batteries (not shown). The sealing structure 10 is preferably bonded or molded to the housing 16.

In the embodiment and as shown in FIG. 2, the housing 16 includes a planar surface 22 that can include a bump 24 extending from the planar surface 22. The cover 18 includes a first planar surface 26 in opposing relation to planar surface 22 of the housing 16. The sealing structure 10 includes an axial seal portion 28 defined as a protrusion extending axially (in the direction of axis A) from a surface of the body 12. Thus, when the cover 18 is secured to the housing 16 with the sealing structure 10 between the planar surfaces 22 and 26, the axial seal portion 28 is compressed axially (in the direction of axis A) to define an axial seal against the first planar surface 26. The bump 24 can ensure that the sealing structure 10 does not slip or move substantially from its desired position during assembly. This also increases the surface area for bonding.

The cover 18 also includes a member or standing rib or wall 30 extending from the first planar surface 26. The standing rib or wall 30 includes a second planar surface 32 that is disposed transversely with respect to the first planar surface 26. The sealing structure 10 includes a radial seal portion 34 defined as a protrusion extending radially (transverse with respect to axis A) from a surface of the body 12.

Thus, when the cover 18 is secured to the housing 16 with the sealing structure 10 between the planar surfaces 22 and 26, the radial seal portion 34 is compressed radially (in a direction transverse with respect to axis A) by the standing rib or wall 30 to define a radial seal against the second planar surface 32.

The sealing structure 10 includes a lip seal portion 36 that extends generally axially in a cantilevered manner from the body 12 so that when the cover 18 is secured to the housing 16 with the sealing structure 10 between the planar surfaces 22 and 26, the lip seal portion 36 is compressed to define a lip seal against the first planar surface 26. In the sectional view of FIG. 2, the lip seal portion 36 is at a side of the body 12 that is opposite the side where the radial seal portion 34 is disposed. The planar surfaces 22 and 26 are preferably smooth surfaces.

Thus, the body 12 of the sealing structure 10 integrally provides a radial, axial and lip seal in a very compact space. This sealing arrangement is more robust against flatness and snap issues and is also robust against higher pressure differentials. The seal structure 10 can include any combination of the radial, axial and lip seal.

Although a gasket-type sealing structure 10 is disclosed, the sealing structure 10 can be comprised of foam. Although it is more difficult to create a uniform sealing bead with foam, the trapped gasses in the foam make for a soft conforming seal. However, depending on the application, with foam seals, detailed shapes such as lips may be more difficult to achieve.

Advantageously, the sealing structure 10 of the embodiment combines features of an O-ring and lip seal in a compact area to create three seal compression points (triple seal) between the cover 18 and housing 16 for robust sealing of a battery compartment (interior 20) against fluids/debris (e.g., dust) at greater depths and pressure differential. Deflection of the soft material of the seal structure 10 is in a radial direction as well as in the axial direction. The lip seal portion 36 of the seal structure 10 offers greater sealing, since pressure outside the device 15 that is applied to it presses the lip seal portion 36 tighter to the mating, first planar surface 26. Also, the higher the pressure, the more force presses the radial seal portion 34 against the standing rib or wall 30.

It can be appreciated that the teachings of the embodiment described herein are also applicable to configure components and devices other than those listed above, for example, the embodiment can be applied to any device that seals a serviceable battery cavity between a cover and housing.

It can also be appreciated that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the embodiments. Also, common but well-understood elements that are useful or necessary in a commercially feasible embodiment are often not depicted in order to facilitate a less obstructed view of these various aspects of the present embodiment. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A sealing structure for sealing first and second components of a device in combination with the first and the second components of the device, the second component being removable from the first component to gain access to an interior of the device, the combination comprising:
   the sealing structure and the first and the second components of the device;
   the sealing structure comprising:
      a body composed of compressible material,
      an axial seal portion integral with the body and constructed and arranged to be compressed to define an axial seal between the first and second components,
      a radial seal portion integral with the body and constructed and arranged to be compressed to define a radial seal between the first and second components, and
      a lip seal portion integral with the body and constructed and arranged to be compressed to define a lip seal between the first and second components;
   the sealing structure preventing fluid and debris from entering the interior;
   wherein the first component is a housing having a planar surface and the second component is a cover having a first planar surface, and a second planar surface disposed transversely with respect to the first planar surface, such that when the cover is secured to the housing with the sealing structure disposed between the planar surface of the housing and the first planar surface of the cover, 1) the axial seal portion is compressed axially, defining an axial seal against the first planar surface, 2) the radial seal portion is compressed radially, defining a radial seal against the second planar surface, and 3) the lip seal portion is compressed to define a lip seal against the first planar surface;
   wherein the axial seal portion, the lip seal portion, and the first planar surface define a void therebetween.

2. The combination of claim 1, wherein the body has an opening there-through, defining a gasket.

3. The combination of claim 2, wherein the body is constructed and arranged to substantially surround an area to be sealed.

4. The combination of claim 1, wherein the body is composed of foam.

5. The combination of claim 4, wherein the foam includes gasses trapped therein.

6. The combination of claim 1, wherein the lip seal is constructed and arranged to be exposed to pressure outside the device.

7. The combination of claim 1, wherein the second planar surface of the cover is part of a standing rib or wall that extends transversely from the first planar surface.

8. The combination of claim 1, wherein the axial seal portion is a protrusion extending axially from a surface of the body.

9. The combination of claim 1, wherein the radial seal portion is a protrusion extending radially from a surface of the body.

10. The combination of claim 1, wherein the lip seal portion extends generally axially in a cantilevered manner from the body.

11. A method of sealing a device having a first component and second component, the second component being removable from the first component so as to gain access to an interior of the device, the method comprising the steps of:
   providing a single sealing structure having an axial seal portion, a radial seal portion, and a lip seal portion,
   placing the sealing structure on a surface of the first component,
   securing the second component to a housing so that 1) the axial seal portion is compressed axially to define an axial seal against a first surface, 2) the radial seal portion is compressed radially, defining a radial seal against a second surface, and 3) the lip seal portion is compressed to define a lip seal against the a first surface thereby sealing the interior;
   wherein the axial seal portion, the lip seal portion, and the first planar surface define a void therebetween.

12. The method of claim 11, wherein the second component is a cover of a fob and the first and second surfaces are planar surfaces of the cover.

13. The method of claim 12, wherein first component is a housing of the fob and the surface of the first component is a planar surface that opposes the first surface of the cover permitting the axial seal portion to be compressed axially during the securing step.

14. The method of claim 13, wherein the second surface is disposed transversely with respect to the first surface.

15. The method of claim 11, wherein the sealing structure is provided as a gasket and the placing step includes placing the sealing structure so as to substantially surround the interior.

16. The method of claim 11, wherein the sealing structure is provided as a foam member including gasses trapped therein.

* * * * *